May 8, 1928.
I. J. BAKER
1,668,753
COMBINED TIRE GAUGE AND INDICATOR
Filed June 30, 1923
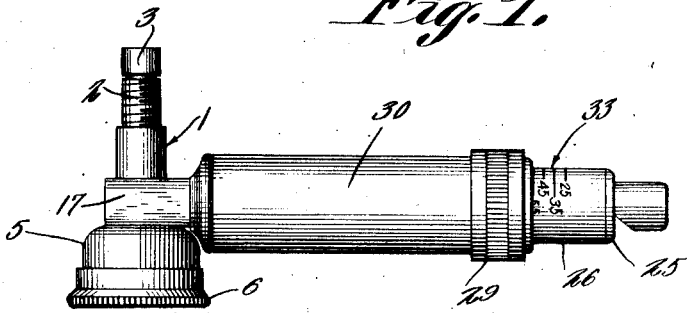
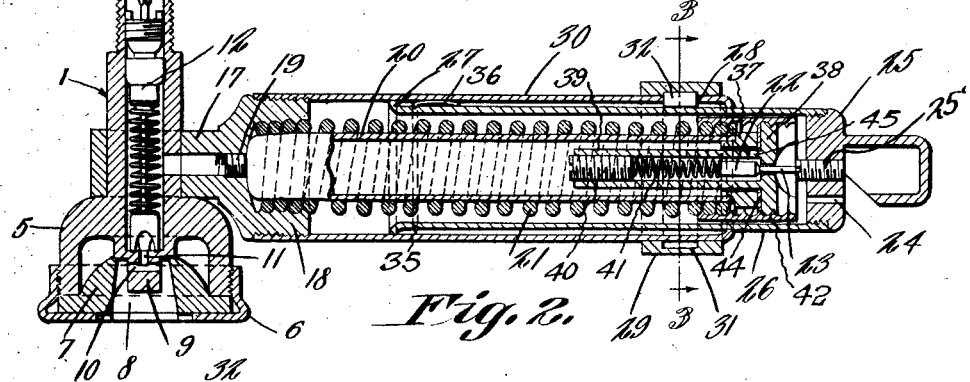
Inventor,
I. J. Baker.
By C. A. Snow & Co.
Attorneys.

Patented May 8, 1928.

1,668,753

UNITED STATES PATENT OFFICE.

IRVIN J. BAKER, OF LATTY, OHIO.

COMBINED TIRE GAUGE AND INDICATOR.

Application filed June 30, 1923. Serial No. 648,737.

This invention relates to a combined tire gauge and indicator.

The object of the invention is to provide a device of this character for use in connection with the inflation of pneumatic tires and the like constructed so as to be set at a predetermined pressure so that when pressure in the tire reaches that point the air will escape and sound an alarm, and which also may be used as a tester or indicator to show the pressure already in the tire.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a side elevation of a gauge constructed in accordance with this invention.

Fig. 2 is a longitudinal section thereof.

Fig. 3 is an enlarged transverse section taken on the line 3—3 of Fig. 2; and

Fig. 4 is a detail longitudinal view showing the modified form of head for connection with the tire valve.

In the embodiment illustrated, the combination gauge and indicator constituting this invention includes a tubular body 1 having a reduced threaded extension 2 adapted for connection with the source of air supplied under pressure such as an air line or a pump. A removable cap 3 is inserted in the reduced end 2 and has a comparatively small opening 4, which cap is designed to be used when the device is used with an air line to prevent flooding of the gauge, said cap to be removed when the gauge is used in connection with a pump. The body 1 is provided at the other end thereof with an enlarged head 5 having a removable screw cap 6 and a packing 7 of rubber located therein between it and said head. This cap and packing have registering enlarged apertures as 8 into which projects a stud 9 carried by the body 1 and equipped with a transversely extending bore 10 which communicates through an opening 11 with the interior of the body.

A common valve 12 such as is ordinarily used with pneumatic tires is mounted in the body 1 and is constructed to permit air to enter through said body from the outer end thereof and to prevent it from passing out of the body.

A tubular shank or stem 17 extends laterally from one side of the body 1 and merges into a large hollow head 18 which has threaded engagement with a tubular casing or shell 30. Arranged within the shell 30 is a longitudinally expansible and contractible casing 20 surrounded by a closely coiled spring 21 and equipped at its inner end with a reduced tubular extension 19 which is threaded into the shank 17, the flexible and inflatable member 20 with the coiled wire wound there around is inserted in the head 18 as is shown clearly in Fig. 2. A spring closed valve 22 is located in the outer end of the member 20, which valve has a pin 23 carried thereby and adapted when moved inwardly to open said valve and permit the air within the casing 20 to pass out and escape through an opening 24 in a head 25 of a movable tubular shell 26. This shell 26 telescopically engages the shell 30 and at its inner end is equipped with a laterally extending flange 27 which closely fits the inner face of shell 30, said shell 26 being normally and freely slidable back and forth in shell 30. A friction device or drag is located between shells 26 and 30 to yieldably hold said shells in adjusted position relatively to each other for a purpose to be described. This drag as shown comprises a wire 35 encircling shell 26 and having an outwardly bowed arm 36 arranged longitudinally between the shells and contacting with shell 30 thereby yieldably holding said shells in adjusted position. The shell 30 has a circumferentially extending slot 28 for a purpose presently to be described.

A knurled collar 29 encircles the slotted end of shell 30 and is provided on its inner face with a cam 31 which cooperates with a roller 32 mounted in the slot 28 of the shell 30 so that when the knurled collar 29 is rotated the action of the cam 31 will be to force the roller 32 into locking engagement with the shell 26 and thus lock said shell in adjusted position. It will thus be seen that the locking means above described is concealed and protected and all danger of sand or grit getting into the gauge is prevented.

The shell 26 is provided on its outer face with indicia shown at 33 to indicate the pressure in the tire.

When it is desired to test a tire to determine the pressure of air therein the head 5 of the gauge is placed over the tire valve the collar 29 having first been turned to disconnect shell 26 from shell 30 so that when the stud 9 bears against and opens the tire valve the air will rush out from the tire into the flexible expansible member 20 and force said member outwardly carrying shell 26 so that a glance at said shell will show the air pressure in the tire. The shells 26 and 30 are held in this position by the friction member 35 so that the gauge may be removed from the tire for reading or other purposes without changing the relation of the shells.

When it is desired to inflate a tire the slidable shell 26 is positioned to indicate the desired amount of pressure to be inserted and is locked in this position by turning the collar 29, the cam face of which engaging roller 32 locks casing 26 relative to casing 30. The head 5 is then placed over the tire valve in the manner above set forth and an air line inserted in the socket of the cap 3 and air under pressure will pass in through the opening 4 through the body 1 into the tire and when the desired pressure has been obtained the air backing out through the casing 20 will expand said casing sufficiently to open valve 22 and permit the air to escape through the aperture 24 which will cause a whistling sound and attract the attention of the operator to the fact that the tire has sufficient air entered into it. This escape of the air not only sounds the alarm but prevents excessive pressure obtaining in the tire.

Mounted on the outer end of the member 20 is a collar 37 and abutting against this collar is a head 38 carried by a tube 39 which opens through said head and is closed at its other end by a screw plug 40 which forms an adjustable seat or abutment for a coiled spring 41 which holds valve 22 normally seated to close the opening in head 38. Head 38 is externally threaded to receive a threaded sleeve 42 which also has threaded engagement with spring 21 whereby the parts are connected and held in operative position. A gasket 44 is located between head 38 and collar 37 to form a fluid tight connection at this point. The tube 39 has openings as 45 formed adjacent the head 38 to permit the air under pressure to enter the tube at the sides thereof in planes at right angles to the path of movement of the valve 22 and pass out through the opening controlled by said valve. This valve opens against the tension of its spring 41 by engagement of the stem 23 with a stud 25ᵃ adjustably mounted in the closure 25 so that when high pressure obtains the valve will open equally well and not be forced to its seat as would be the case if the air entered in longitudinal alinement with the valve and impinged against the end thereof.

When the compressed air is to be supplied by means of a pump the cap 3 is removed and the pump nipple is connected direct with the extension 2 in the well known manner.

In Fig. 4 a slightly modified form of head 5ᵃ is shown having a removable cap 6ᵃ together with units 13 and 14 arranged therein and held in place by a coiled spring 15 which encircles a reduced extension 16 carried by the body 1 and extending into said head.

Various changes in the form, shape, proportion and other minor details of construction may be made without departing from the principle or sacrificing any of the advantages of the claimed invention.

I claim:—

1. A device of the class described including telescopically engaged members one of which is movable relative to the other, and a drag located between said members to frictionally hold said movable member in adjusted position, said drag being in the form of an annular member encircling said movable member and having an outwardly bowed arm extending longitudinally between said members to frictionally hold said movable member in adjusted position.

2. A device of the class described comprising fixed and movable telescopically engaged shells, compressed air supply means, a longitudinally expansible and contractible casing mounted in said shells and communicating with said air supply means, said casing having an outlet, a tube mounted in said casing around said outlet and closed at its inner end, a valve in the outer end of said casing for closing said outlet, a spring to hold the valve normally closed, said tube having an air inlet opening in the side thereof adjacent said valve to permit air to enter in a plane at right angles to the path of movement of the valve and to pass out through the outlet on the opening of the valve when a predetermined pressure is reached thereby preventing the air pressure from interfering with the operation of the valve.

3. A device of the class described comprising fixed and movable telescopically engaged shells, a longitudinally expansible and contractible casing mounted on said shells, air supply means communicating with said casing, said casing having an outlet, a tube mounted in said casing around said outlet and provided with an adjustable closure at its inner end, a valve in its outer end for closing said outlet, a spring to hold the valve normally closed and mounted between the valve and said adjustable closure, said tube having air inlet openings in the sides thereof adjacent said valve to provide for the admission of the compressed air from the casing in a plane at right angles to the plan of movement in the valve, the air so admitted passing out through the outlet on the opening of the valve, and cooperating means carried by said valve and the outer shell for opening the valve when a predetermined pressure is reached in the casing.

In testimony that I claim the foregoing as my own, I have hereto affixed my signature.

IRVIN J. BAKER.